United States Patent
Felter et al.

(10) Patent No.: US 7,925,901 B2
(45) Date of Patent: Apr. 12, 2011

(54) METHOD AND SYSTEM FOR ESTIMATING PROCESSOR UTILIZATION FROM POWER MEASUREMENTS

(75) Inventors: Wesley M. Felter, Austin, TX (US); Charles R. Lefurgy, San Marcos, TX (US); Tyler Bletsch, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 11/686,418

(22) Filed: Mar. 15, 2007

(65) Prior Publication Data

US 2008/0229127 A1 Sep. 18, 2008

(51) Int. Cl.
*G06F 1/26* (2006.01)
*G06F 1/32* (2006.01)

(52) U.S. Cl. ........ 713/300; 713/310; 713/320; 713/321; 713/322; 713/323; 713/324; 713/330; 713/340; 702/60; 702/180

(58) Field of Classification Search .......... 713/300, 713/310, 320–324, 330, 340; 702/60, 180
See application file for complete search history.

(56) References Cited

U.S. PATENT DOCUMENTS

| | | | |
|---|---|---|---|
| 6,513,124 B1 | 1/2003 | Furuichi et al. | |
| 6,704,876 B1 | 3/2004 | Iacobovici et al. | |
| 6,795,927 B1 | 9/2004 | Altmejd et al. | |
| 6,795,928 B2 | 9/2004 | Bradley et al. | |
| 6,816,809 B2 | 11/2004 | Circenis | |
| 6,829,713 B2 | 12/2004 | Cooper et al. | |
| 6,845,456 B1 * | 1/2005 | Menezes et al. | 713/320 |
| 7,017,060 B2 | 3/2006 | Therien et al. | |
| 7,272,517 B1 * | 9/2007 | Brey et al. | 702/60 |
| 7,346,787 B2 * | 3/2008 | Vaidya et al. | 713/300 |
| 7,434,083 B1 | 10/2008 | Wilson | |
| 7,739,548 B2 * | 6/2010 | Goodrum et al. | 714/20 |
| 7,757,107 B2 * | 7/2010 | Goodrum et al. | 713/320 |
| 2002/0194509 A1 | 12/2002 | Plante et al. | |
| 2002/0194517 A1 | 12/2002 | Cohen et al. | |
| 2003/0065960 A1 | 4/2003 | Rusu et al. | |
| 2003/0126479 A1 | 7/2003 | Burns et al. | |
| 2004/0041538 A1 | 3/2004 | Sklovsky | |
| 2004/0059956 A1 | 3/2004 | Chakravarthy et al. | |

(Continued)

OTHER PUBLICATIONS

Wang, et al., "Managing Peak System-Level Power with Feedback Control", IBM Research Report RC23835, Dec. 2005.

(Continued)

*Primary Examiner* — Abdelmoniem Elamin
(74) *Attorney, Agent, or Firm* — Mitch Harris, Atty at Law, LLC; Andrew M. Harris; Libby Z. Toub

(57) ABSTRACT

A method and system for estimating processor utilization from power measurements provides an estimate of processor utilization that can be computed outside of the processor and operating system. Measurements of the processor power consumption are gathered over short intervals in a histogram. The idle power consumption of the processor is determined, and a threshold value higher than the idle power consumption level is computed from the idle power consumption. The number of histogram counts for bins greater than the threshold is normalized to the total number of measurements, providing a fractional value that corresponds to the processor utilization over the measurement interval. The fractional value can then be used in a power management algorithm that adjusts the frequency and optionally the voltage of the processor or group of processors based on their utilization.

33 Claims, 4 Drawing Sheets

U.S. PATENT DOCUMENTS

| | | |
|---|---|---|
| 2004/0225902 A1 | 11/2004 | Cesare et al. |
| 2005/0060594 A1 | 3/2005 | Barr et al. |
| 2006/0129852 A1 | 6/2006 | Bonola et al. |
| 2006/0156042 A1 | 7/2006 | Desai et al. |
| 2006/0253715 A1 | 11/2006 | Ghiasi et al. |
| 2006/0288241 A1 | 12/2006 | Felter et al. |
| 2006/0294400 A1 | 12/2006 | Diefenbaugh et al. |
| 2007/0016814 A1 | 1/2007 | Rusu et al. |
| 2008/0141047 A1 | 6/2008 | Riviere-Cazaux |

OTHER PUBLICATIONS

Weiser, et al., "Scheduling for Reduced CPU Energy", "Proceedings of the First Symposium on Operating Systems Design and Implementation," Usenix Association Nov. 1994.

Bohrer, et al.: "The Case for Power Management in Web Servers", IBM Research, Austin TX, 2002.

\* cited by examiner

METHOD AND SYSTEM FOR ESTIMATING PROCESSOR UTILIZATION FROM POWER MEASUREMENTS

CROSS-REFERENCE TO RELATED APPLICATIONS

The present application is related to previously-filed U.S. patent application Ser. No. 11/289,249 filed on Nov. 29, 2005, now U.S. Pat. No. 7,260,487, entitled "HISTOGRAM DIFFERENCE METHOD AND SYSTEM FOR POWER/PERFORMANCE MEASUREMENT AND MANAGEMENT" and Ser. No. 11/380,101 filed on Apr. 25, 2006, now U.S. Pat. No. 7,272,517 and entitled "METHOD AND SYSTEM FOR PROVIDING PERFORMANCE ESTIMATIONS FOR A SPECIFIED POWER BUDGET." The above-referenced Patent Applications have at least one inventor in common with the present application and are assigned to the same assignee. The specifications of the above-referenced Patent Applications are incorporated herein by reference.

BACKGROUND OF THE INVENTION

1. Technical Field

The present invention relates generally to power/performance measurement and management in processing systems, and more particularly, to an estimation scheme that can estimate processor utilization from power measurements.

2. Description of the Related Art

Power management in both large and small scale systems has become a necessity, for reason of both thermal management and power cost and power availability. In particular, very large scale systems may not be installed or fabricated with enough power availability or thermal handling capability to run all processors in the system at their maximum performance levels continuously. Nor is such use typically desirable. Further, under power supply fault conditions, it is possible to continue operating at a lower power level when multiple power supplies are available and one of them has failed. Power management can then provide a mechanism for most effectively handling the processing loads under such less-than-ideal power availability conditions.

Sophisticated power management systems generally calculate the expected utilization of each processor and set the frequency (and optionally the voltage) of each processor at the bare minimum to accomplish the tasks required for a given workload. However, such power management systems require operating system resources and installation of special software for determining the workloads and the processing needs. The software is typically operating system dependent, and therefore must be provided for each possible operating system that may be executed on the platform. The resources used to manage the processors' frequency and voltage must be limited to small portion of the system processing requirements, or the purpose of power management is defeated by consuming resources just for power management. As such, the response time must also necessarily be limited, as providing finer processor utilization measurement granularity raises the amount of power management overhead. The impact of the power management overhead is also greatest at the lowest levels of processor utilization and typically sets the baseline processor utilization value, as the power management tasks may be the only executing task, when all application and other operating system threads are in a hold state. Further, such information is not typically available during boot and shutdown time, as well as during maintenance operations, since the driver used to monitor processor utilization is typically not loaded at under these circumstances.

Large-scale multi-module server rack systems typically include a service processor in each module, or sometimes associated with each processor that performs management tasks under control of a hypervisor. At present, and as described in the above-incorporated U.S. patent applications, the service processor is sometimes used to inform the operating systems of power consumption information that is used as part of the processor utilization computation. The service processor is also generally responsible for managing the power management state changes, e.g., selecting the operating frequency and voltage of each associated processors. However, the service processor does not typically perform the processor utilization computations alone, because such computations require knowledge of the operating system and application activity within the operating system environment. Service processor workloads do not typically impact the performance of the application processors and operating system environments, and also typically do not substantially affect the system energy consumption, other than by adjusting the performance level of the application processors. Therefore performing tasks in the service processor is desirable, if the tasks can be handled by the service processor and there is sufficient information readily available to the service processor.

It is therefore desirable to provide a method and system for estimating processor utilization while adding no or little additional overhead to the application processors, workloads. It would further be desirable to perform such tasks using the service processors, so that power management control can be performed completely out-of-band of the application and operating system environment.

SUMMARY OF THE INVENTION

The objectives of providing processor utilization based power management via a service processor that adds no overhead to operating systems and the application processors, is achieved in a method and system for power management.

The method and system estimate the processor utilization from actual power measurements made by the service processor and the processor utilization is determined via a distribution of the power consumption over small time intervals. The intervals are made short enough to capture the nominal processor utilization variation that occur when threads are halted and resumed. A set of samples is collected over a large number of the intervals, according to a histogram of counts in power consumption "bins" corresponding to ranges of processor power consumption.

The idle power consumption level of a processor is determined and a threshold value above the idle value is computed from the idle power consumption level. The ratio of the number of samples having a power consumption value lying above the threshold to the total number of samples provides a fractional indicator of the processor utilization as a fraction of the maximum processor utilization. The fraction as computed for each processor in a power-managed group can then be used in a power management algorithm that sets the frequency and optionally the voltage of the processors in the group.

The idle power consumption is determined from the current power management mode (e.g., processor voltage and frequency selection) and may either be a set of fixed values determined previously for the system, or a calibration sequence may be executed at startup and/or periodically to determine idle power consumption for the system under actual environmental conditions. In the calibration procedure, an idle loop is executed for each of the power management settings and measured power consumption values are stored for later use in determining expected idle power consumption values from which the idle state threshold is computed.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns a technique for determining processor utilization without involving information provided from operating systems or applications executing on the processor, and without requiring special hardware integrated within the processor, such as usage counters. The method and system of the present invention can determine processor utilization by observing the power consumption of the processor, in particular by measuring the current drawn from the power supply that supplies voltage to the processor. The power consumed by a processor, when observed over intervals short enough to capture substantially all of the differences in power consumption between thread halted states versus executing states (and not merely averaging them), tends to be distributed strongly bi-modally. The lower power consumption distribution peak corresponds to the idle or halted state, while the higher power consumption peak corresponds to various degrees of processor utilization above idle.

By gathering a reasonably large number of samples of the power consumption in a histogram, and then computing the fraction of the samples corresponding to the higher processor utilization levels with respect to the total number of samples, an accurate measure of the processor utilization is obtained. Since the distribution is strongly bi-modal, separating the lobes in the distribution can be achieved by many different techniques. One technique is to estimate the idle power consumption of the processor and raise that number by a factor such as 1.1 (10% greater). Any histogram bin above 110% of the idle power consumption level can be assumed to contribute to the average (non-idle) processor utilization on the interval over which the histogram was gathered.

The idle power consumption level can be determined from previous measurements, which can either be fixed (e.g., factory-determined) values for the particular processor, or may be determined by running a periodic and/or boot-time calibration routine that measures a set of actual power consumption levels for each power management setting. In either case, the currently-selected power management mode is used to select the predetermined idle power consumption value, and the above-described threshold can then be determined from the selected idle power consumption value. Alternatively, the idle power consumption level can be determined by using the lowest non-zero power consumption bin in the histogram, but if no predetermined power consumption levels are used, the histogram must generally be observed to determine whether or not two lobes are present that correspond to the idle and busy states. If two lobes are not present, a further determination of whether the processor is 100% idle or 100% busy is needed.

Figure 1:
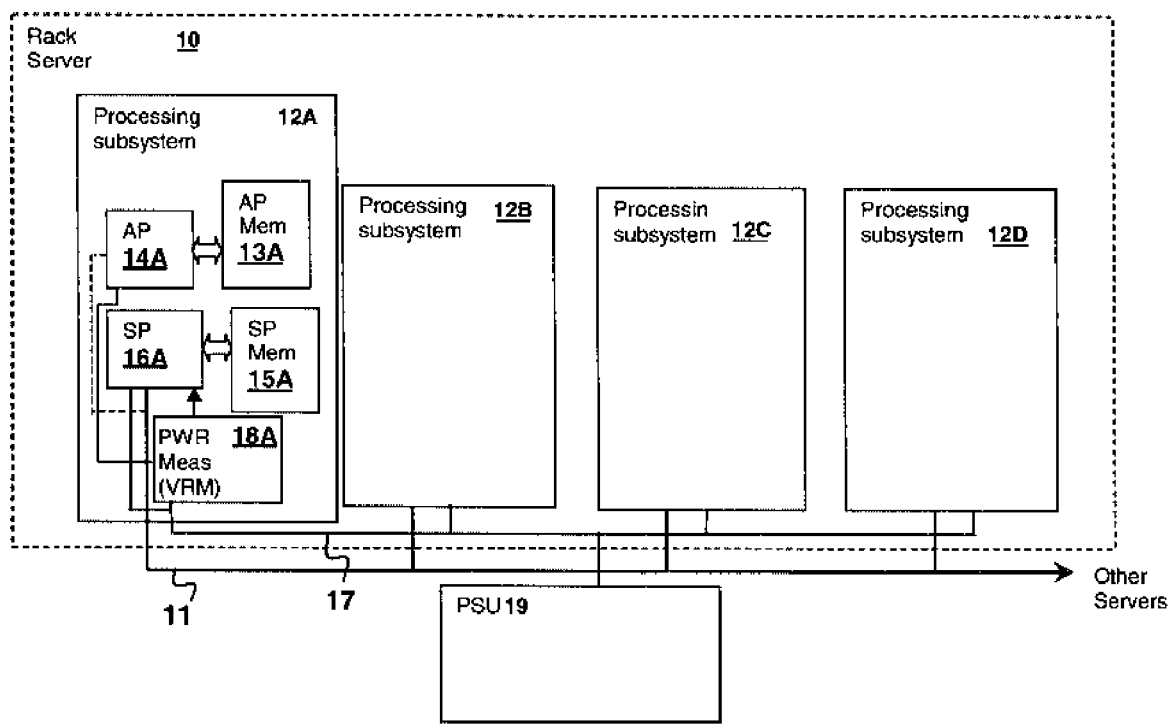
FIG. 1 is a block diagram of a multiple processing unit computing system in accordance with an embodiment of the invention.

Referring now to FIG. 1, a processing system is depicted in accordance with an embodiment of the present invention. Processing subsystems 12A-12D illustrate identical sub-units of the overall system, rack server 10, interconnection between processing subsystems 12A-12D is provided by a bus 11 that can also provide connection of the system to peripheral devices. Such connections and devices generally exist in processing systems and are understood in the art and can take on a variety of interconnect forms. The techniques of the present invention can also be applied in large-scale systems encompassing multiple rack servers 10 or other groups of computing systems.

Within processing subsystem 12A, an application processor (AP) 14A is coupled to an application memory (AP Mem) 13A, which generally represent the processor and storage per processing system or "blade" that run operating environments, virtual machines, server instances and/or other tasks associated with the primary functions of the computing system. Also within processing system 12A (and similarly for the other identical processing systems 12B-12D), a service processor (SP) 16A provides control and monitoring functions for the processing system 12A including in the present embodiment, the accumulation of power consumption histogram data. Service processor 16A is coupled to a service processor memory (SP Mem) 15A that stores service processor program instructions and data that provides the power measurement data collected and analyzed in the techniques of the present invention. Service processor 16A also controls the frequency and optionally the core voltage of application processor 14A and can halt the processor 14A, change external clocks or re-program phase-lock loop (PLL) divider factors and alter the power supply output voltages to change the power consumed by application processor 14A.

A power supply unit (PSU) 19 provides power to processing subsystems 12A-12D through one or more power buses 17 and may comprise more than one power supply unit operating in tandem (e.g., separate PSUs for each of other identical processing systems 12B-12D) or may supply power to separate partitions of the system. A power measuring unit 11A is shown within processing subsystem 12A, and is also present in other subsystems 12B-12D. Power measuring unit may be incorporated within a voltage regulator module (VRM) that provides for voltage regulation in addition to current measurement, and in particular, voltage control in response to a digital signal that selects the processor voltage as part of the power management schemes described herein. Power measuring unit 18A is configured to measure the power supplied to application processor 14A, so that the distribution of the measured power can be used as an indicator of the utilization of application processor 14A. However, the power measurement may alternatively include the entire processing subsystem 12A if the power consumption of service processor 16A and service processor memory 15A is negligible or constant, and the power consumed by AP memory 13A is either negligible or tracks the variation in power consumed by application processor 14A. While the figure provides a concrete example of an architecture that implements the above-described performance estimating technique, the depicted architecture should not be construed as limiting. For example, the processor utilization of a uniprocessor system may also be estimated, just as each subsystem (e.g., processor, memory and I/O subsystems) is independently monitored and a processor utilization estimate generated for each processor in the above-described embodiment. A VRM such as one incorporated within power measurement unit 18A receives commands from service processors, such as service processor 16A, to adjust the voltage supplied to application processors, such as application processor 14A, in conformity with a selected operating frequency. The selected operating frequency and voltage of the processors can be determined in conformity with the results of the utilization estimate for the processor, so that the most efficient operation of the system is achieved. Generally, the optimum operating point attempts to keep the entire system 100% busy at the lowest selectable power consumption mode for each processor, i.e., the lowest operating frequency and voltage.

Figure 2:
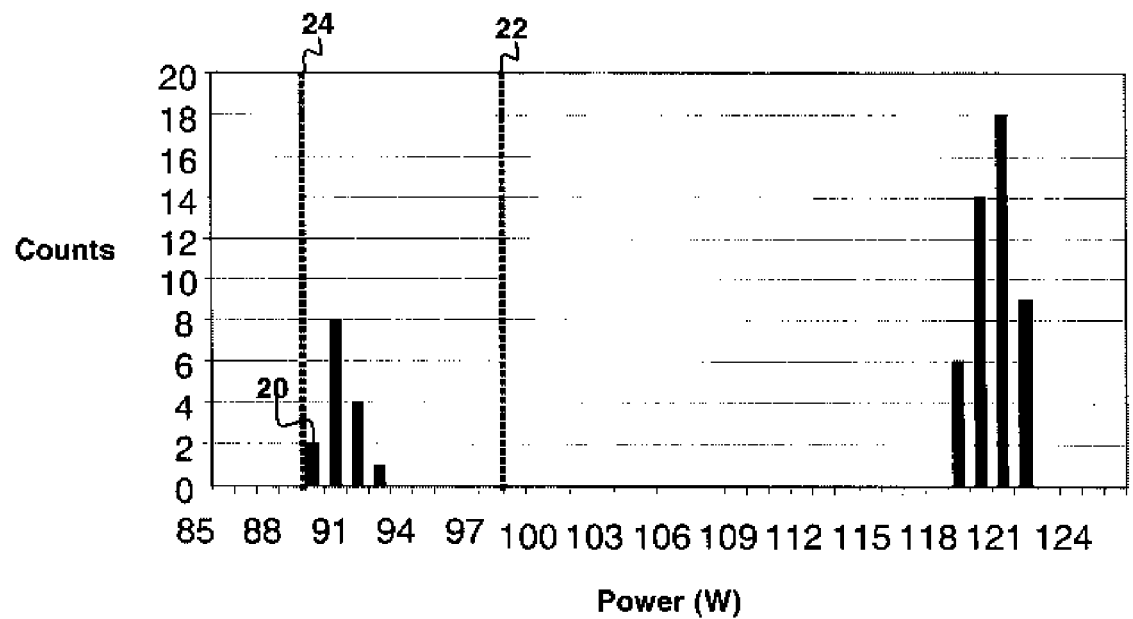
FIG. 2 is a pictorial diagram depicting a histogram method in accordance with an embodiment of the invention.

Referring now to FIG. 2, a histogram is shown that illustrates the generally bi-modal distribution of the power consumption levels of processors. Between lines 20 and 22, the power consumption samples are regarded as corresponding to idle intervals of operation of the processor, generally where threads are halted to wait on timers or external events. The power consumption samples at the far right of the histogram are grouped closely together with respect to the power consumption level, and correspond to the "busy" intervals of operation of the processor, in which the processor is performing operations for active threads. By selecting a threshold value of power consumption for a threshold located at line 22, a decision between which counts of the histogram correspond to the busy intervals is made. The number of counts in the bins corresponding to busy intervals, i.e., to the right of line 22 can then be normalized by dividing by the total number of counts (samples) to determine a number that is a good estimate of the processor utilization. In the exemplary embodiment, threshold line 22 is computed as 110% of a previously determined idle power consumption value for the currently selected power management mode. The previously determined idle power consumption value may be selected from a fixed set of values for the system, or may be determined from a boot-time or periodic calibration. As mentioned above, alternatively, the lowest idle interval power consumption value may be used if two distinct lobes are present in the histogram, e.g., a value corresponding to the leftmost histogram bin in the diagram that has a non-zero count. In the exemplary histogram, in the alternative embodiment, idle value line 20 would determined to be at a value of 90, so the threshold value line 22 is determined as 110% of 90, or 99. Otherwise, a predetermined value such as idle value 24 can be used to determine the threshold. However, the exemplary threshold-determining method described above should not be taken as limiting, as many alternative techniques can be used to determine a threshold that will divide the idle and busy power consumption bins in the histogram. For example, a central (nominal) position in the middle zero-valued portion of the histogram could be used. If no continuous zero-valued interval is present, a count threshold could be used to remove measurement "noise." Other manipulations such as curve fitting or differentiating an integral (sum) of the counts across the histogram could be used to determine the boundaries of the idle and busy power groupings.

Figure 3:
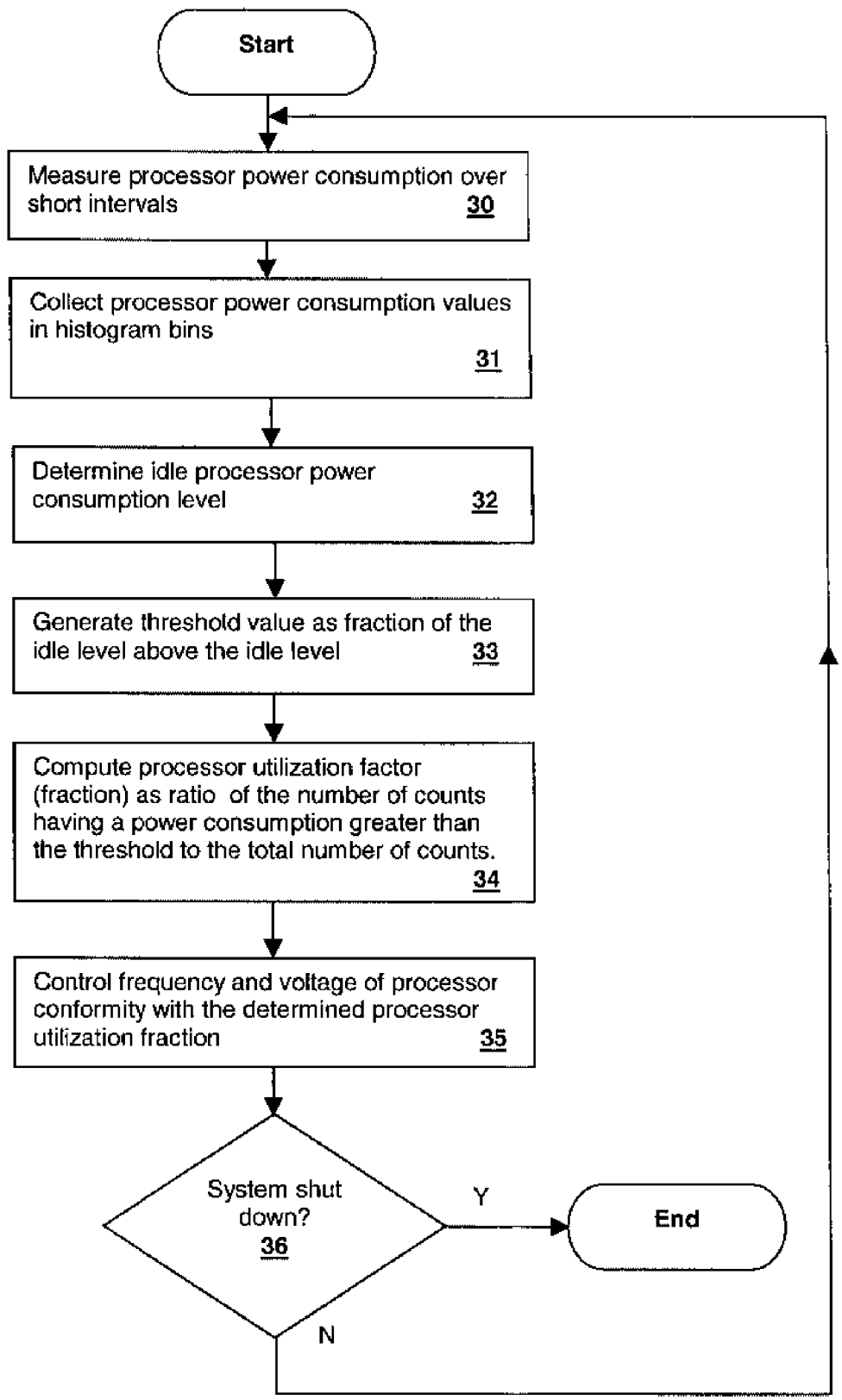
FIG. 3 is a flowchart depicting a method in accordance with an embodiment of the present invention.

Referring now to FIG. 3, a method in accordance with an embodiment of the present invention is shown. The processor power consumption is measured over short intervals (step 30) and the power consumption values are collected in histogram bins (step 31). An idle power consumption value is determined (step 32), for example by selecting a predetermined value from a table or locating the lowest non-zero bin power value as described above. A threshold value is computed from the idle value, for example by multiplying by a factor greater than one, such as 1.10 (step 33). The processor utilization factor is computed as a ratio of the number of counts having a power consumption level greater than the threshold to the total number of counts (step 34). Finally, the frequency and voltage of the processor can be controlled in conformity with the processor utilization factor determined in step 34 (step 35). Until the system (or measurement process) is shut down (decision 36), steps 30-35 are repeated, and a different threshold and ratio are computed dynamically. By performing all of the process dynamically, the threshold can track changes in idle power consumption level, so there is no need to adjust the measurements for changes in power management settings such as processor voltage and frequency, nor for environmental changes such as temperature. If the threshold were not computed dynamically, the lowest performance (lowest frequency/voltage) busy level might be less than the highest performance idle level.

Figure 4:
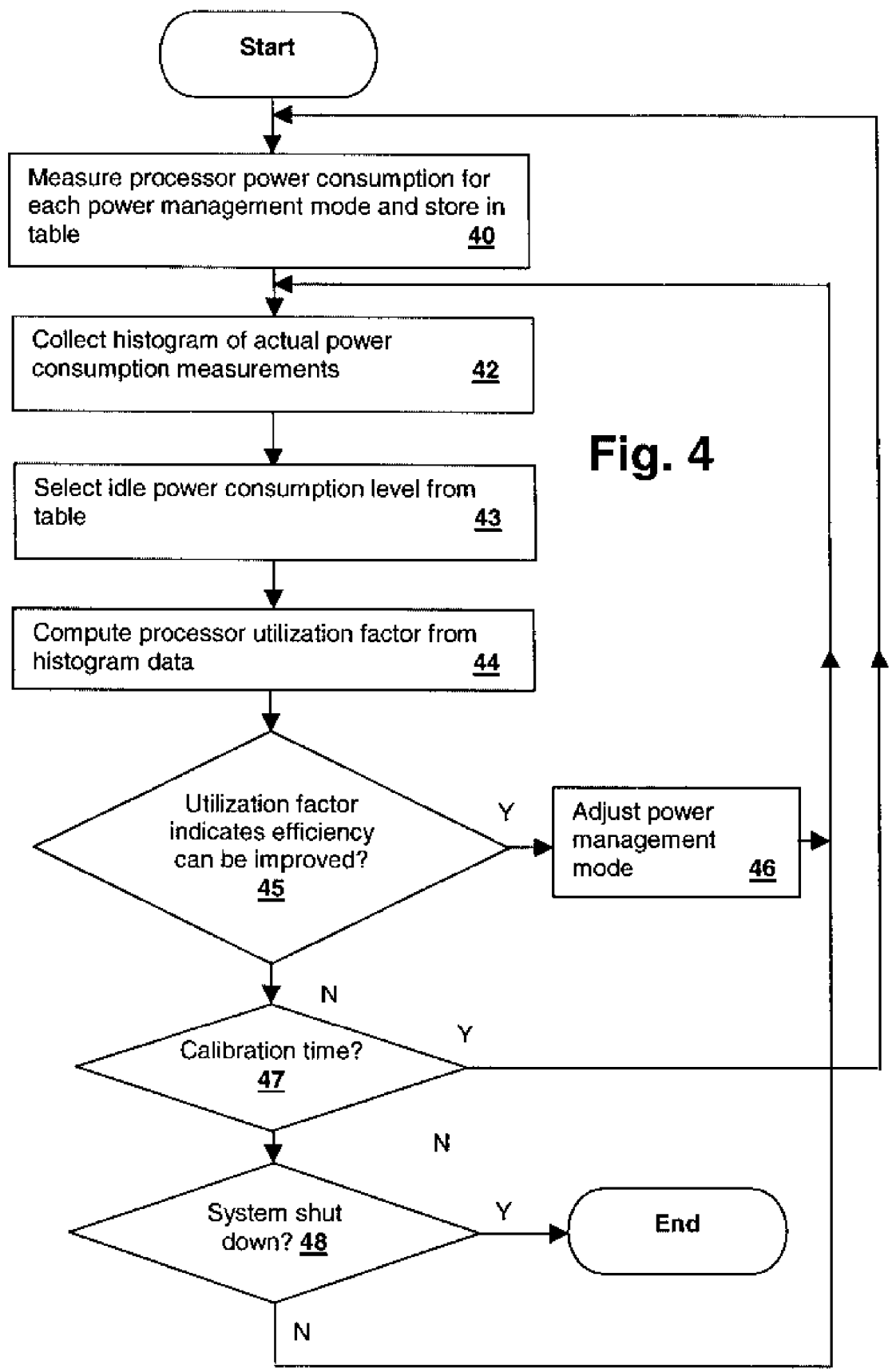
FIG. 4 is a flowchart depicting a method in accordance with another embodiment of the present invention.

Referring now to FIG. 4, a method in accordance with another embodiment of the present invention is shown. At start-up the processor idle power is measured for each power management mode and stored in a table (step 40). Actual power consumption histogram data is collected during system operation (step 41). Periodically, the idle power consumption level corresponding to the current power management mode is retrieved from the table (step 43) and the processor utilization factor is computer from the histogram data and a threshold determined from the retrieved idle power consumption level (step 44). If the computer utilization factor indicates that efficiency can be improved (decision 45) the power management mode is adjusted (step 46). If a periodic calibration timer has elapsed (decision 47), then the calibration of step 40 by continuing operation from step 40. Otherwise, until the system is shut down, or the process is otherwise terminated (decision 48) operation resumes from step 41.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A computer performed method of estimating processor utilization for at least one processor, said method comprising:
   collecting samples of actual power consumption of said processor over a plurality of measurement intervals;
   first determining an idle power consumption level of said processor;
   first computing a threshold value from said idle power consumption level that is greater than said idle power consumption level;
   second computing an estimate of said processor utilization as a fraction of a number of said samples having a power consumption level greater than said threshold value to the total number of said samples; and
   storing said estimate in a memory.

2. The computer performed method of claim 1, wherein said collecting, determining, first computing, second computing and storing are performed by a service processor coupled to said at least one processor.

3. The computer performed method of claim 1, further comprising controlling a frequency of said at least one processor in conformity with said estimate.

4. The computer performed method of claim 3, further comprising controlling a voltage of a power supply of said at least one processor in conformity with said estimate.

5. The computer performed method of claim 1, wherein said collecting comprises accumulating counts of values of said actual power consumption in corresponding ones of a plurality of storage locations corresponding to bins of a histogram, and wherein said second computing comprises:
    second determining a set of bins having a power consumption range lower bound value greater than said threshold value;
    summing all of said counts accumulated in said set of bins to obtain a sum;
    normalizing said sum by a total number of counts in all of said bins to obtain said estimate as a fraction of said total number of counts.

6. The computer performed method of claim 1, wherein said first determining comprises selecting said idle power consumption level from an idle power consumption table in conformity with a currently-selected power management mode of said processor.

7. The computer performed method of claim 1, wherein said first determining determines said idle power consumption level from a lowest power consumption value from among said samples.

8. The computer performed method of claim 1, wherein said first computing a threshold computes said threshold from said idle power consumption level by multiplying by a factor having a value between 1 and 2.

9. The computer performed method of claim 8, wherein said factor is substantially equal to 1.1.

10. A processing system, comprising:
    at least one processor for which processor utilization is to be characterized;
    a service processor coupled to a power supply measurement unit that supplies power to said at least one processor and further coupled to a service processor memory for storing service processor program instructions for execution by said service processor, wherein said service processor program instructions comprise program instructions for:
    collecting samples of actual power consumption of said processor over a plurality of measurement intervals;
    first determining an idle power consumption level of said processor;
    first computing a threshold value from said idle power consumption level that is greater than said idle power consumption level;
    second computing an estimate of said processor utilization as a fraction of a number of said samples having a power consumption level greater than said threshold value to the total number of said samples; and
    storing said estimate in a memory.

11. The processing system of claim 10, wherein said service processor program instructions further comprise program instructions for controlling a frequency of said at least one processor in conformity with said estimate.

12. The processing system of claim 11, wherein said service processor program instructions further comprise program instructions for controlling a voltage of a power supply of said at least one processor in conformity with said estimate.

13. The processing system of claim 10, wherein said program instructions for collecting accumulate counts of values of said actual power consumption in corresponding ones of a plurality of storage locations corresponding to bins of a histogram, and wherein said program instruction for second computing comprise program instructions for:
    determining a set of bins having a power consumption range lower bound value greater than said threshold value;
    summing all of said counts accumulated in said set of bins to obtain a sum;
    normalizing said sum by a total number of counts in all of said bins to obtain said estimate as a fraction of said total number of counts.

14. The processing system of claim 10, wherein said program instructions for first determining select said idle power consumption level from an idle power consumption table in conformity with a currently-selected power management mode of said processor.

15. The processing system of claim 10, wherein said program instructions for first determining determine said idle power consumption from a lowest power consumption value from among said samples.

16. The processing system of claim 10, wherein said program instructions for first computing a threshold compute said threshold from said idle power consumption level by multiplying by a factor having a value between 1 and 2.

17. The processing system of claim 16, wherein said factor is substantially equal to 1.1.

18. A computer program product comprising a computer readable storage medium storing program instructions for execution by a service processor for estimating utilization of another processor, said program instructions comprising program instructions for:
    collecting samples of actual power consumption of said processor over a plurality of measurement intervals;
    first determining an idle power consumption level of said processor;
    first computing a threshold value from said idle power consumption level that is greater than said idle power consumption level;
    second computing an estimate of said processor utilization as a fraction of a number of said samples having a power consumption level greater than said threshold value to the total number of said samples; and
    storing said estimate in a memory.

19. The computer program product of claim 18, wherein said service processor program instructions further comprise program instructions for controlling a frequency of said at least one processor in conformity with said estimate.

20. The computer program product of claim 19, wherein said service processor program instructions further comprise program instructions for controlling a voltage of a power supply of said at least one processor in conformity with said estimate.

21. The computer program product of claim 18, wherein said program instructions for collecting accumulate counts of values of said actual power consumption in corresponding ones of a plurality of storage locations corresponding to bins of a histogram, and wherein said program instruction for second computing comprise program instructions for:
    second determining a set of bins having a power consumption range lower bound value greater than said threshold value;

summing all of said counts accumulated in said set of bins to obtain a sum;

normalizing said sum by a total number of counts in all of said bins to obtain said estimate as a fraction of said total number of counts.

22. The computer program product of claim 18, wherein said program instructions for first determining select said idle power consumption level from an idle power consumption table in conformity with a currently-selected power management mode of said processor.

23. The computer program product of claim 18, wherein said program instructions for first determining determine said idle power consumption from a lowest power consumption value from among said samples.

24. The computer program product of claim 18, wherein said program instructions for first computing a threshold compute said threshold from said idle power consumption level by multiplying by a factor having a value between 1 and 2.

25. The computer program product of claim 24, wherein said factor is substantially equal to 1.1.

26. A processing system, comprising:
at least one processor for which processor utilization is to be characterized;
a service processor coupled to a power supply measurement unit that supplies power to said at least one processor and further coupled to a service processor memory for storing service processor program instructions for execution by said service processor, wherein said service processor program instructions comprise program means for computing an estimate of said processor utilization from samples of power supply consumption taken at intervals from said power supply measurement unit.

27. The processing system of claim 26, wherein said service processor program instructions further comprise program means for
dividing said samples into samples corresponding to substantially non-idle intervals of operation of said at least one processor and computing said estimate of said processor utilization from a fraction of a total measurement interval corresponding to non-idle operation of said at least one processor.

28. The processing system of claim 26, further said service processor program instructions further comprise program means for controlling a power consumption level of said at least one processor in conformity with said computed estimate.

29. The processing system of claim 26, wherein said program means for computing an estimate include program means for collecting said samples in a histogram.

30. A computer system comprising:
at least one first processor for executing at least one operating system and associated applications; and
at least one second processor for monitoring a power consumption level of said at least one processor, wherein said at least one other processor further computes a processor utilization as a fraction of total processor utilization for said at least one first processor from said monitored power consumption level, wherein said processor utilization is computed without participation by said at least one first processor, whereby performance of said at least one first processor is measured independent of performance estimating overhead that would otherwise be introduced by participation of said at least one first processor.

31. The computer system of claim 30, wherein said at least one second processor further manages a power consumption level of said at least one first processor by controlling a frequency of said at least one first processor.

32. The computer system of claim 31, wherein said at least one second processor further manages a power consumption level of said at least one first processor by controlling a power supply voltage of said at least one first processor.

33. The computer system of claim 30, wherein said at least one first processor comprises at least two processors, and wherein said at least one second processor manages power consumption of said at least two processors to meet a budgetary constraint in conformity with said processor utilization as measured for each of said at least two processors.

\* \* \* \* \*